United States Patent [19]
Chiappetta et al.

[11] 3,874,158
[45] Apr. 1, 1975

[54] WIRE ROPE WITH PLASTIC IMPREGNATED LUBRICATED CORE

[75] Inventors: Ferdinand Chiappetta; Fred Edgar Dykeman, both of Kenosha, Wis.

[73] Assignee: Amsted Industries Incorporated, Chicago, Ill.

[22] Filed: Oct. 29, 1973

[21] Appl. No.: 410,812

[52] U.S. Cl. .................................. 57/149, 57/153
[51] Int. Cl. ...................... D07b 1/06, D07b 1/16
[58] Field of Search ............ 57/139, 144, 145, 149, 57/153, 162, 164

[56] References Cited
UNITED STATES PATENTS

| | | | |
|---|---|---|---|
| 2,485,019 | 10/1949 | Somerville | 57/153 |
| 3,195,299 | 7/1965 | Dietz | 57/149 |
| 3,318,082 | 5/1967 | Riggs | 57/149 |
| 3,705,489 | 12/1972 | Smollinger | 57/149 |
| 3,778,994 | 12/1973 | Humphries | 57/149 |
| 3,800,522 | 4/1974 | Hughes et al. | 57/149 |

*Primary Examiner*—Donald E. Watkins

[57] ABSTRACT

A wire rope with a standard-size independent wire rope core and a standard outer diameter, the core being filled with a heavy viscous lubricant and impregnated with a thermoplastic material to entrap the lubricant in the core.

3 Claims, 1 Drawing Figure

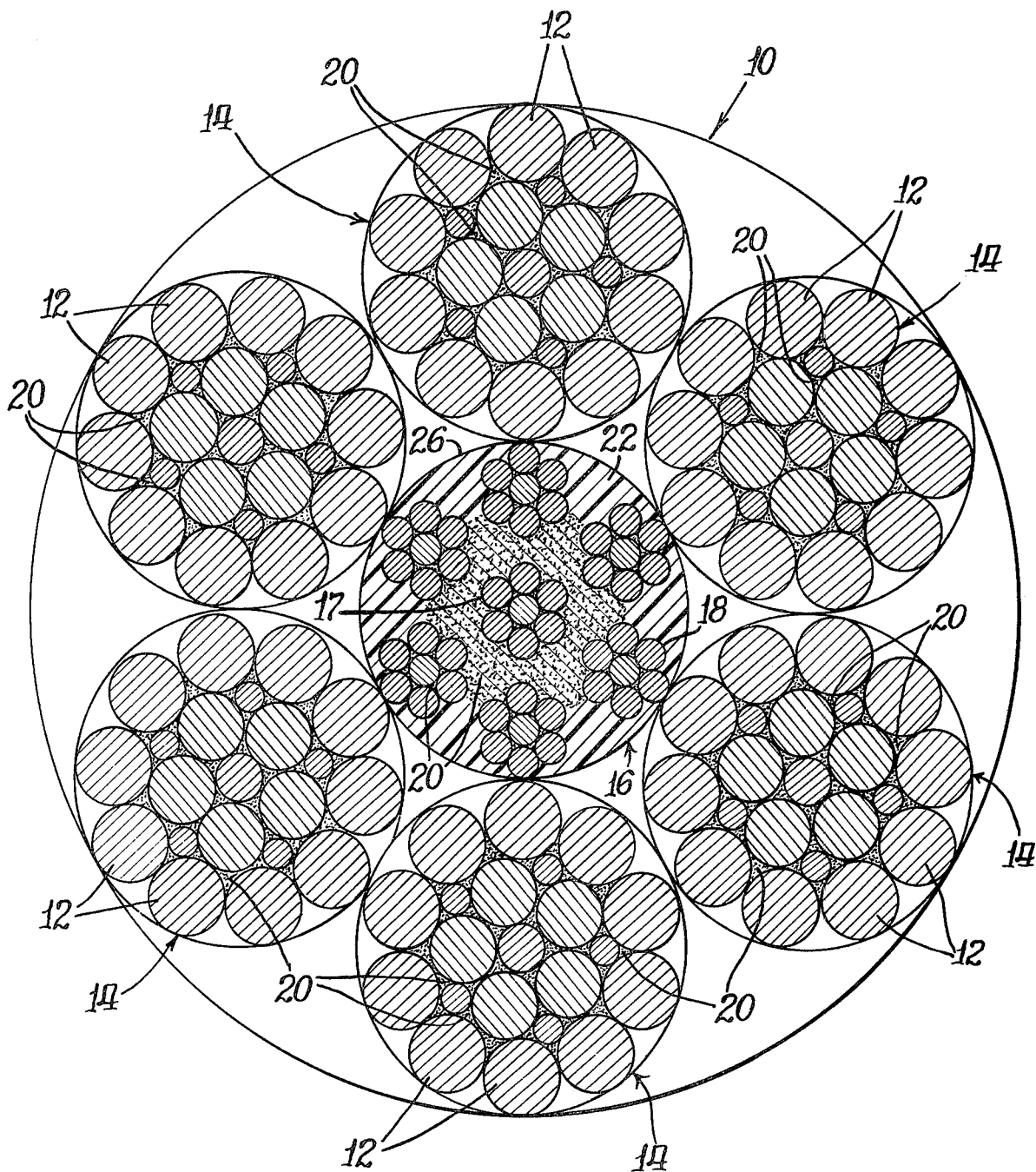

WIRE ROPE WITH PLASTIC IMPREGNATED LUBRICATED CORE

This invention relates to wire rope and particularly to a wire rope having a plastic impregnated, lubricated, independent wire rope core.

There are many known types of plastic impregnated wire rope made for the purpose of improving fatigue life, reducing stresses, and inhibiting corrosion. In the case of ropes having strands surrounding a core, some benefit has been obtained by plastic impregnating or coating the outer strands. Even greater benefits have been achieved by first lubricating the rope and then coating the outer periphery to entrap the lubricant therein.

In attempts to achieve greater flexibility while simultaneously decreasing the quantity of plastic required, it has been suggested to apply a plastic coating to a lubricated independent wire rope core. The theory behind these attempts was that the plastic coating over the core would entrap the lubricant therein, thereby eliminating the difficult job of trying to relubricate the core during the service life of the rope. The outer strands, on the other hand, can be periodically relubricated by external means as the need arises. Such prior art attempts, however, have not been entirely satisfactory. For example, either the outer diameters of such ropes are greater than the outer diameters of the same classification of rope without the coated core, or the core is smaller than normal thereby decreasing the load carrying ability of such ropes. Still further, the outer diameter of such ropes tend to change during service.

It is a primary object of the present invention to produce a standard stock, heavily lubricated wire rope having an independent wire rope core which is impregnated with a load bearing thermoplastic such that the viscous lubricant of the core is entrapped therein, the rope having an outer diameter which is the same as that of a standard stock rope without any coating.

Another object is to provide a lubricated standard stock wire rope having a plastic impregnated independent wire rope core, the plastic outer diameter being substantially the same as the core diameter, and the strands of the core being equally spaced.

These and other objects and advantages will be apparent from the following description and accompanying drawing wherein:

The single FIGURE is a cross-sectional view of a typical wire rope formed in accordance with the teaching of the present invention.

The present invention utilizes a conventional wire rope 10 wherein individual wires 12 are wound into strands 14, and a plurality of strands are wound about a core 16 which is also preferably formed of a central strand 17 and a plurality of outer core strands 18 wound around strand 17. It should be understood that the central strand 17 of the core 16 may be formed of a fiber material such as hemp instead of metallic wires as indicated in the drawing. The particular rope shown in the drawing is given by way of example because the teaching of this invention may be applied to any of the various rope configurations utilizing an independent wire rope core.

During fabrication of the wire rope core 16, a heavy viscous lubricant 20 is pumped around each wire as it is formed into strands 17 and 18 and once again around each strand in forming the core. Conventional lubricants suitable for this purpose are, for example, petrolatum, which has a melting point of about 100°F. and is applied cold, or an asphaltic based lubricant which has a melting point of about 180°F. and is applied hot. The manner of fabricating such a lubricated wire rope is, of course, conventional and well known in the wire rope making art.

A flexible thermoplastic 22 is preferably extruded, under a pressure in the range of about 2000 to 4000 PSI and while holding the strands 18 spaced from each other, into the interstices between the strands 16 of the rope core, but not extending outwardly beyond the outer diametrical limits of the core 16 as indicated at 26. The thermoplastic can be any of those capable of being extruded such as polypropylene, polyurethane, polyethylene, nylon or tetrafluoroethylene. The outer strands 14 are then wound around the core in a conventional manner. It should be noted that dimensions of the individual strands, the core, and the finished wire rope are the same as the corresponding dimensions of a standard rope without any coating.

Impregnation of the lubricated independent wire rope core with plastic as described above prevents entrance of foreign abrasive particles into the core while sealing lubricant therein, thereby increasing the rope service life. Another advantage is a reduction in wire notching effect and internal friction because the loads placed on the core strands are shared substantially equally by the spaced internal wires. Furthermore, a lubricated wire rope having a core impregnated with plastic, will have extremely good resistance to fatigue and an increased ultimate breaking strength because of a reduction in internal wire contact, all while maintaining flexibility.

I claim:

1. A wire rope comprising: a lubricated core including a central strand and a plurality of outer core strands wound therearound; a flexible thermoplastic material filling the spaces between the outer core strands to retain the lubricant in the core, the thermoplastic material extending outwardly only to the outer diametrical limits of the core; and a plurality of strands wound around the core.

2. A wire rope according to claim 1, wherein the outer core strands are substantially equally spaced.

3. A wire rope comprising: an independent wire rope core including a central strand and a plurality of outer core strands wound therearound and substantially equally spaced from each other; a heavy, viscous lubricant filling the interstices between the central strand and the outer core strands; a flexible, thermoplastic material filling the spaces between the outer core strands to hold the lubricant in the interstices, the thermoplastic material extending radially outward only to the outer periphery of the core; and a plurality of strands wound around the core.

* * * * *